INVENTOR
A. L. QUINLAN
BY C. B. Hamilton
ATTORNEY

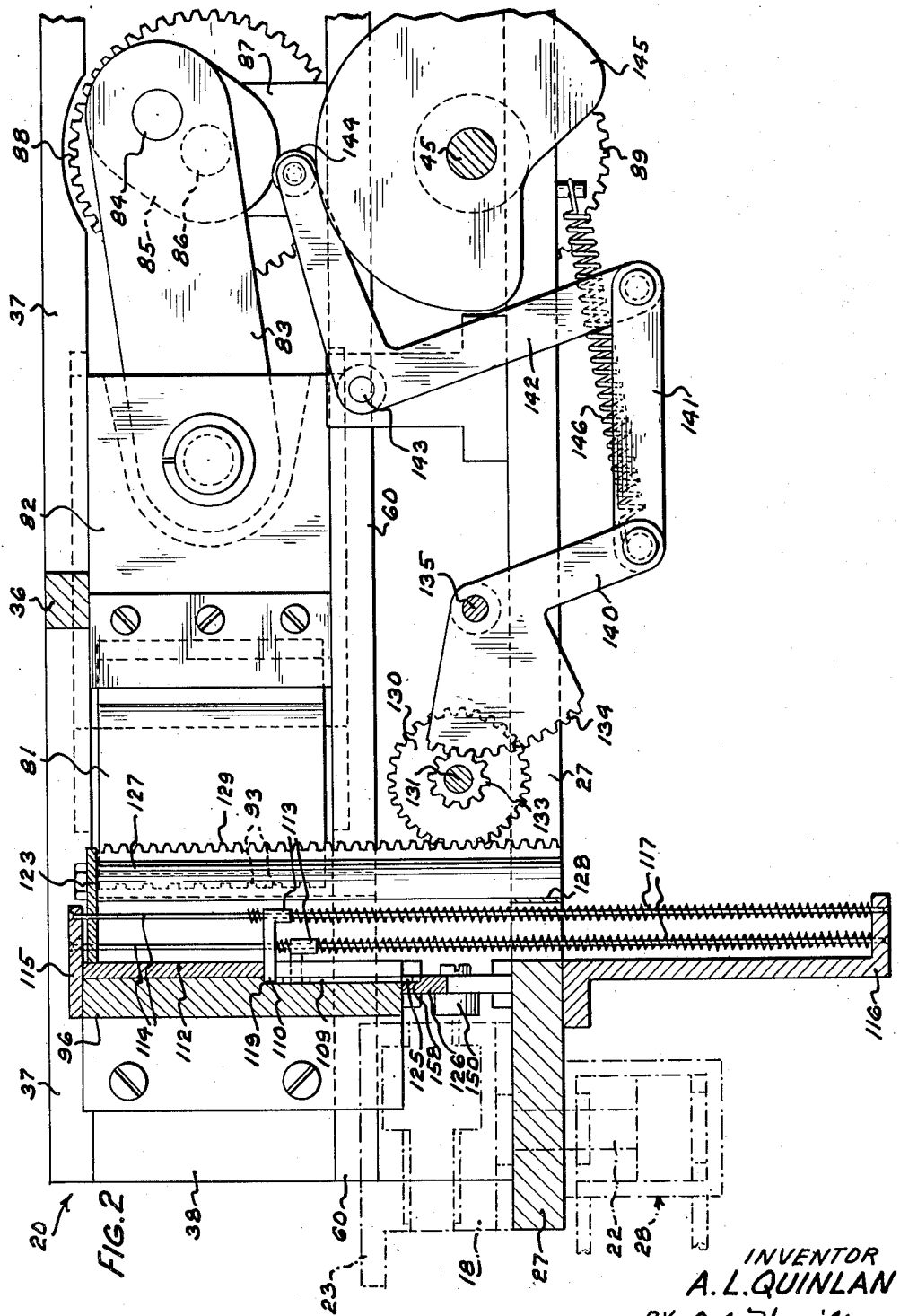

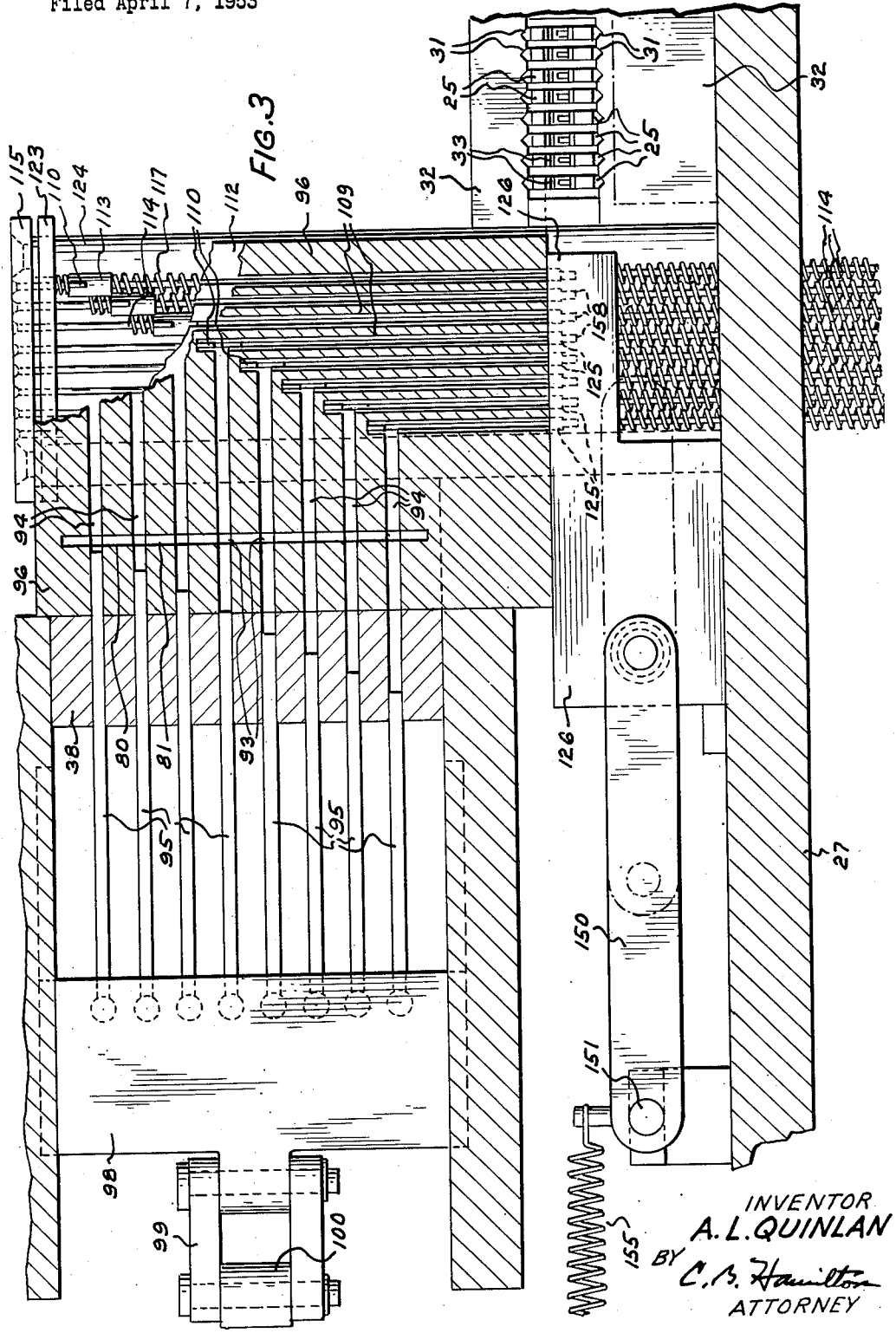

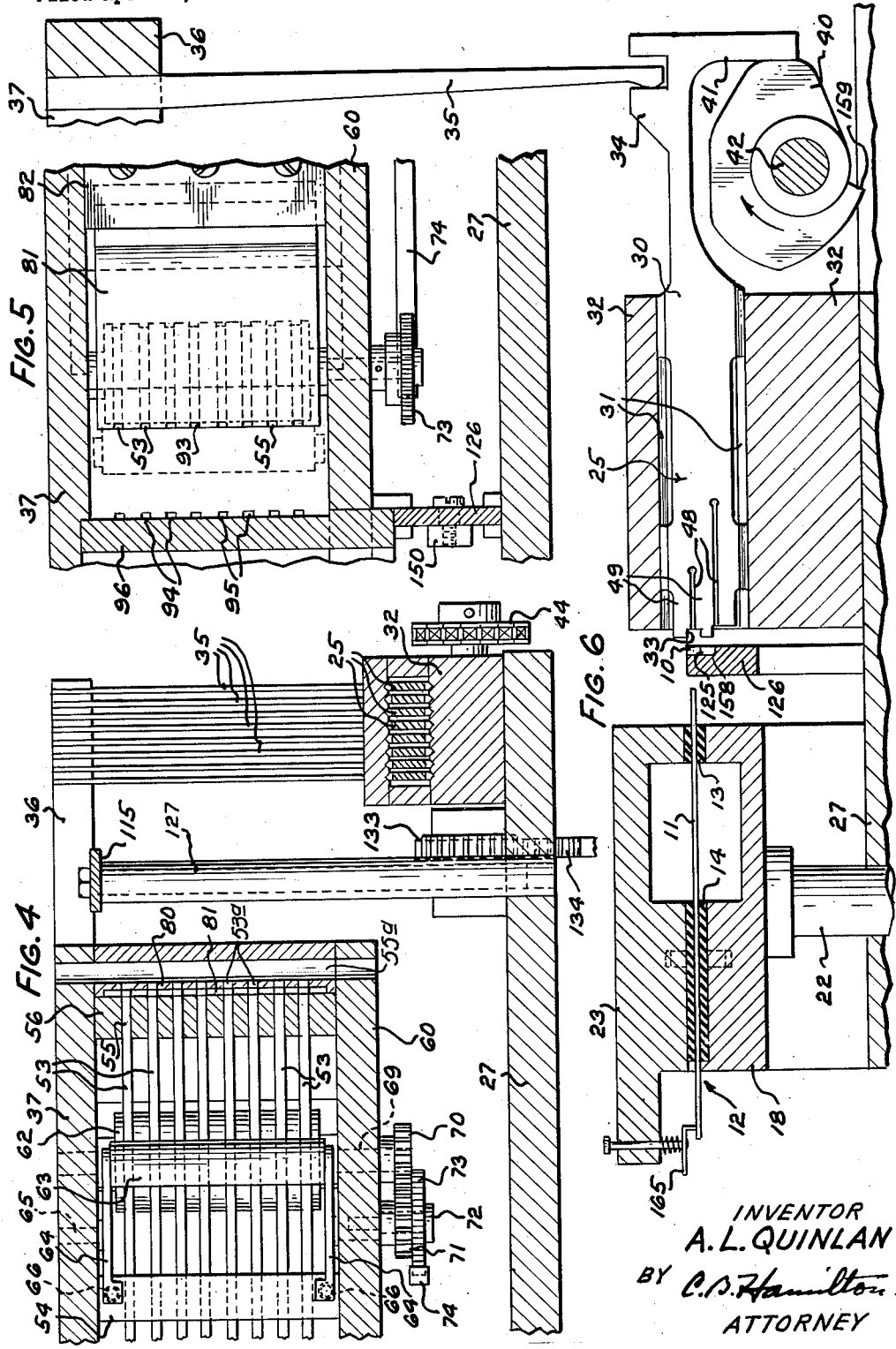

United States Patent Office 2,798,936
Patented July 9, 1957

2,798,936

METHOD OF AND APPARATUS FOR WELDING CONTACTS ONTO RELAY PARTS

Amos L. Quinlan, La Grange Park, Ill., assignor to Western Electric Company, Incorporated, New York, N. Y., a corporation of New York Application April 7, 1953, Serial No. 347,370

20 Claims. (Cl. 219—96)

This invention relates to the art of percussion welding and more particularly to a method of an apparatus for welding a plurality of contacts onto the ends of a plurality of wires of a relay component.

It is an object of the present invention to provide an efficient and effective method of an apparatus for percussively welding parts together.

It is a further object to provide an improved method of an apparatus for welding contacts onto the ends of a plurality of wires of a relay part.

In accordance with one embodiment of the invention as applied to the welding of contacts onto the ends of a plurality of wires of a relay component, the relay component is supported with the wires thereof aligned with a plurality of reciprocable welding heads which have recesses for receiving contacts therein and which are actuated simultaneously to thrust the contacts against the ends of the wires, each of the wires and the welding heads aligned therewith being electrically connected to individual normally open welding circuits which are completed by the contacts as they are moved by the welding heads into close proximity to and into engagement with the wires aligned therewith to effect the percussive welding of the contacts onto the wires. Mechanism is provided for supporting the relay component, advancing a plurality of contact tapes, shearing contacts from the tapes, feeding the contacts into the recesses in the welding heads and actuating the welding heads.

Other objects and advantages of the invention will become apparent by reference to the following detailed description thereof and the accompanying drawings illustrating a preferred embodiment, in which—

Fig. 2 is a vertical, longitudinal sectional view taken on the line 2—2 of Fig. 1;

Fig. 3 is an enlarged vertical transverse sectional view taken on the line 3—3 of Fig. 1;

Fig. 4 is a transverse vertical sectional view taken on the line 4—4 of Fig. 1;

Fig. 5 is a vertical longitudinal sectional view through a portion of the apparatus taken on the line 5—5 of Fig. 1;

Fig. 6 is an enlarged fragmentary vertical longitudinal sectional view taken on the line 6—6 of Fig. 1.

Figure 1:
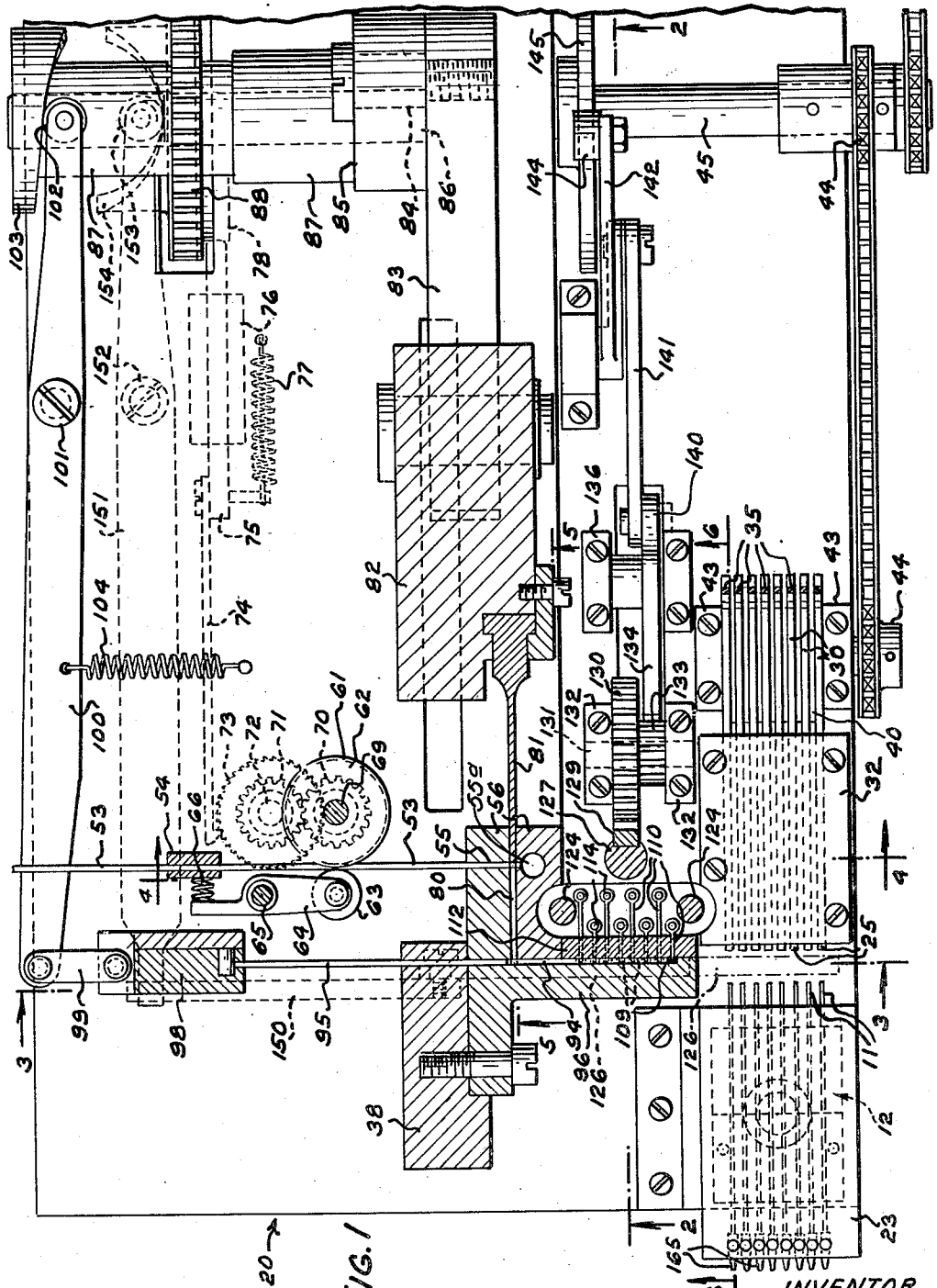
Fig. 1 is a fragmentary plan sectional view of the apparatus.

The present welding apparatus is designed to weld a plurality of contacts 10 (Fig. 7) onto the ends of a plurality of wires 11 of a relay component 12, which includes a pair of blocks 13 and 14 of plastic insulating material into which the wires 11 are molded and arranged in a row in predetermined spaced relation to each other. The relay component 12, as actually built, has a plurality of twelve wires, but for purposes of simplification of illustration, the component is shown as having only eight wires and will be referred to hereinafter as a relay or switch part 12.

The relay part 12 is adapted to be positioned on a supporting member 18 (Fig. 6) of a welding apparatus 20, which supporting member 18 is mounted on a plunger 22 and is adapted to be raised to clamp the relay part 12 against a stationary member 23. The members 18 and 23 are shaped to conform to portions of the relay part 12 and form a holder therefor for supporting the relay part in a welding position with the wires 11 aligned with a plurality of welding electrodes or heads 25 and the contacts 10 carried by the welding heads. The plunger 22 is movable through an aperture in a base plate 27 of the welding apparatus and is actuated by any suitable means, such as a fluid actuator 28 of the piston and cylinder type indicated in dot and dash lines in Fig. 2 and under control of manually operated valve means (not shown).

Each of the welding heads 25 is in the form of a horizontally disposed relatively flat bar 30 with V-shaped rails formed on portions of the upper and lower edges thereof for sliding movement in grooves 31 forming guideways in a stationary block 32 mounted on the base plate 27. At the forward ends thereof the welding heads 25 are provided with horizontally disposed slots 48 (Fig. 6) extending inwardly from the forward end thereof to provide for each head a pair of resilient fingers 49, which are notched to form a recess 33 to receive and yieldably retain a contact 10 therein. At the rear portion thereof each of the bars 30 is provided with a notch forming shoulder 34 against which bears the lower end of one of a plurality of flat springs 35, the upper ends of which are secured to an arm 36 formed on and extending from a horizontally disposed frame plate 37 (Figs. 4 and 6) which is supported in spaced relation to the base plate 27 by suitable vertical frame members including the member 38 (Figs. 1 and 2). The springs 35 are flexed or tensioned to move the welding heads 25 forwardly, which movement of the heads 25 is controlled by a relatively long cam 40 engageable with a downwardly extending arm or cam follower 41 formed on each of the bars 30.

The cam 40 is fixed to a shaft 42 which is journalled in bearings 43 mounted on the base plate 27 and is driven in a clockwise direction as viewed in Fig. 6 through a chain and sprocket connection 44 (Fig. 1) from a main drive shaft 45.

The contacts 10 are severed from a plurality of contact tapes 53 equal in number to the number of wires 11 in the relay part 12, which tapes are guided for horizontal movement through guide passages in a vertically disposed guide member 54 (Figs. 1 and 4) and guide passages 55 in a die member 56 (Figs. 1, 4 and 5). The die member 56 and the vertical guide member 54 are mounted on a horizontal frame plate 60 and extend between the plate 60 and the plate 37 (Figs. 5 and 6). The frame plate 60 is supported on suitable vertical frame members, including the vertically disposed frame member 38.

The tapes 53 engage in annular grooves 61 (Fig. 7) in an elongated feed roll 62 for advancing the tapes in cooperation with a pressure roller 63 adapted to press the tapes into engagement with the feed roll 62. The pressure roller 63 is journalled in the end of a pair of levers 64 pivotally supported at 65 and stressed for rocking movement about the fulcrum 65 by springs 66 (Figs. 1 and 4). The feed roll 62 is fixed to a shaft 69 which is journalled in the horizontal frame plates 37 and 60 and has a gear 70 fixed to its lower end, which meshes with a gear 71 mounted for rotation on a stud 72 secured to the plate 60 (Fig. 4). A ratchet wheel 73 is fixed to the gear 71 and is adapted to be actuated by a pawl 74 fixed to one end of a rod 75, which is mounted for reciprocation in a support 76. A spring 77 stresses the rod for movement in one direction against a cam 78 fixed to the main drive shaft 45 for imparting reciprocation to the rod 75 and through the feed pawl and ratchet to the feed roll 62 for intermittently advancing the tapes 53.

Figure 7:
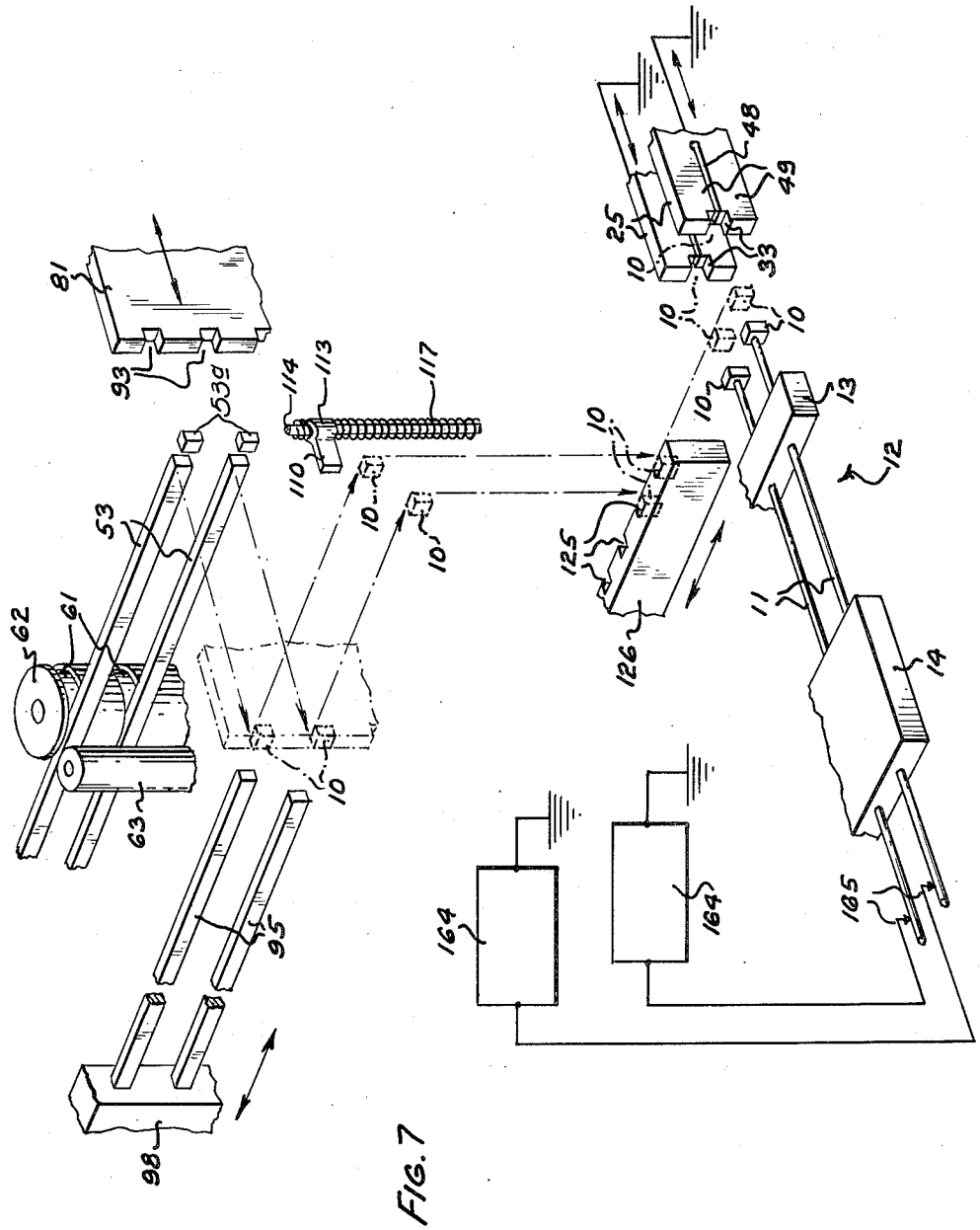
Fig. 7 is a diagrammatic perspective view of the apparatus.

The passageways 55 in the die members 56, through which the tapes 53 are advanced, intersect an elongated vertically disposed passageway 80 to form cutting edges on opposite sides of the passageway 80, which cooperate with the cutting edges on opposite sides of a cutter 81 to sever the tapes along two lines to form the contacts 10 and forming short sections 53a of scrap tape (Fig. 7). As the end portions of the tapes 53 are intermittently advanced across the passageway 80 of the die, they push the scrap sections 53a into a vertical aperture 55a in the die (Figs. 1, 4, and 7) through which they fall onto base plate 27 or into a receptacle provided therefor. The cutter 81 in the form of a flat thin punch is reciprocable in the passageway 80, and is secured to a slide 82 which is guided for reciprocation in guideways formed in the horizontal plates 37 and 60. The slide 82 is connected through a link 83 to a crank pin 84 of a crank arm 85 secured to a shaft 86, which is supported in bearings 87—87 mounted on the plate 60. A gear 88 on the shaft 86 meshes with a gear 89 (Fig. 2) on the main drive shaft 45 for imparting rotation to the shaft 86 and for effecting the reciprocation of the punch 81 in timed relation to the rotation of the main drive shaft.

At its forward end the punch 81 is provided with a plurality of notches or recesses 93 for receiving the tapes 53 therein and for supporting the contacts 10 sheared from the tapes in response to the forward movement of the punch. The contacts 10 are carried by the punch 81 at the end of the forward stroke thereof into alignment with a plurality of horizontal passageways 94 intersecting the passageway 80 and in the path of movement of a plurality of pusher rods 95 reciprocable in the passageways 94. The passageways 94 are formed in the die member 56 and a member 96 secured to the vertical frame member 38 (Figs. 1 and 3).

The pusher rods 95 are secured at one end to a slide 98, which is reciprocable in guideways formed in the plates 37 and 60 and is connected through a pair of links 99 to one end of a lever 100. The lever 100 is pivotally supported intermediate its ends at 101 on the plate 60 and has at its other end a cam follower 102, which engages a cam 103 fixed to the shaft 86. A spring 104 stresses the lever 100 for rotation in one direction and in cooperation with the cam 103 serves to effect the reciprocation of the pusher rods 95 through a predetermined stroke. The forward ends of the pusher rods 95, which are arranged in stepped relation to each other (Fig. 3), engage the contacts 10 in the recesses 93 of the punch 81 and advance the several contacts through different predetermined distances into alignment with a plurality of vertically disposed passageways 109 and in the path of movement of vertically movable pusher members 110. The passageways 109, which are spaced apart distances equal to the spacing of the wires 11 of the relay part 12, are formed in the vertical guide member 96 and a plate 112 secured thereto (Figs. 1, 2 and 3).

The pusher members 110 are in the form of narrow fingers, which extend through vertical slots in the plate 112 and are secured to sleeves 113, which in turn are slidably mounted on vertically disposed rods 114. As shown in Fig. 1 the rods 114 are arranged in staggered relation to each other and are secured at their upper and lower ends to brackets 115 and 116 secured to the member 96 and the base plate 27, respectively. Elongated helical springs 117 (Fig. 2) encircling the rods 114 and interposed between the lower bracket 116 and the sleeves 113 serve to move the pusher members 110 upwardly to their normal upper position, where they engage stop shoulders 119 formed in the member 96 and plate 112 at the upper end of the vertical passageways 109. A pusher plate 123, apertured to receive the rods 114 and a pair of guide rods 124, which extend between and are fixed to the brackets 115 and 116, is adapted to be vertically actuated to reciprocate the pusher members 110 and move the contacts 10 downwardly through the passageways 109 into the recesses 125 of a transfer member or carrier 126. The pusher plate 123 is secured to the upper end of a rod 127, which is guided for vertical reciprocation in an aperture 128 in the base plate 27 and by the pusher plate 123 slidable on the guide rods 124.

Mechanism is provided for reciproating the rod 127 and the pusher plate 123, which comprises a rack 129 (Figs. 1 and 2) on the bar 127 which meshes with a gear 130 fixed to a shaft 131, which is journalled in bearings 132 mounted on the base plate 27. A second gear 133 fixed to the shaft 131 meshes with a gear segment 134 fixed to a shaft 135 journalled in bearings 136, which are mounted on the base plate 27. The gear segment 134 has an arm 140 which is connected through a link 141 to one end of a bell crank 142 mounted for rocking movement on a pivot support 143 and having a cam follower 144 riding on a cam 145. A spring 146 connected to the link 141 imparts movement to the cam segment in one direction and in cooperation with the cam 145 effects the reciprocation of the pusher plate 123 and the reciprocation of the pusher members 110 to effect the transfer of the contacts 10 from the juncture of the horizontal and vertical passageways 45 and 109 to the carrier 126.

The carrier 126 is reciprocable in suitable slideways formed on the base plate 27 and the guide member 96 and is connected through a link 150 (Figs. 1 and 3) to one end of an actuating lever 151 pivotally supported intermediate its ends at 152 on the base plate 27. At its other end, the lever 151 has a cam follower 153, which engages a cam 154 mounted on the main drive shaft 45. A spring 155 connected to the link 150 cooperates with the cam 154 to impart reciprocation to the carrier 126 to transfer the set of contacts 10 supported thereby from a position in alignment with the vertical passageways 109, as shown in Fig. 3, to an advanced position with the contacts in the path of movement of the welding heads 25.

The cam 40 for controlling the actuation of the welding heads 25 is shaped to permit the forward movement of the heads 25 into engagement with the carrier 126 to cause the contacts 10 to be received within the recesses 33 and gripped by the spring fingers 49 and yieldably retained in the heads 25. The carrier 126 is provided with recesses 158 (Figs. 3 and 6) disposed below the recesses 125 and forming a reduced continuation thereof for providing clearance for the lower ones of the fingers 49 of the welding heads 25 to permit movement of the welding head 25 into engagement with the contacts 10 in the carrier and the transfer of the contacts 10 from the carrier 126 to the heads 25. With the contacts 10 yieldingly gripped in the recesses 33, the welding heads 25 are retracted and then the carrier 126 is retracted.

As previously stated, the welding heads 25 are stressed for movement forwardly by the springs 35 and the movement of the head is controlled by the rotating cam 40, except when the follower 41 drops off of the shoulder 159 of the cam, at which time the heads 25 are propelled to thrust the contacts 10 carried thereby into engagement with the ends of the wires 11 of the relay part 12.

The welding current is supplied to each of the wires 11 and the associated contacts 10 by a plurality of current generating devices 164 (Fig. 7), which are connectible to one end of the wires 11 through a connector terminal 165 (Figs. 6 and 7) yieldably mounted on and insulated from the stationary member 23 of the relay part holder. As the relay part 12 is moved upwardly by the movable supporting member 18 against the stationary member 23 into welding position, the end portions of the wires 11 engage the terminal connectors 165 and are connected thereby into the welding circuits. The current generating devices 164 and the welding heads 25 are grounded to the frame of the apparatus to connect the contacts 10 carried by the gun into the welding circuit. As the contacts 10 move into close proximity to the ends of the wires 11 during the forward movement of the contacts as they are driven against the wires, electric arcs are drawn between the wires 11 and the contacts 10, fusing the ends of the wires and the adjacent portions of the contacts to establish a strong welded joint therebetween.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A method of forming contacts and percussively welding them onto articles which comprises advancing a tape of contact material, shearing a contact from said tape, transferring the contact to a welding electrode, supporting an article in the path of movement of the welding electrode and the contact thereon, impressing a welding voltage across the article and the contact in the welding electrode, and moving the welding electrode toward the article to bring the contact into percussive engagement with the article to fuse them together.

2. A method of welding contacts onto a plurality of wires on an electrical part which comprises the steps of intermittently advancing a plurality of contact tapes, shearing contacts from said tapes, feeding the contacts to a plurality of welding heads, supporting an electrical part with the wires thereof in the path of movement of said welding heads, electrically connecting the welding heads and the wires aligned therewith to normally open welding circuits, and propelling the welding heads toward the electrical part to thrust the contacts into engagement with said wires for completing the welding circuits and effecting the welding of the contacts onto said wires.

3. A method of forming contacts and welding them onto articles which comprises advancing a tape of contact material, simultaneously shearing the tape at two spaced portions to form a contact, feeding the contact to and supporting it on a movable welding electrode, supporting an article in the path of movement of said welding electrode, electrically connecting the welding electrode and the article to a device for supplying welding current thereto, and moving the welding electrode toward the article to bring the contact into percussive engagement with the article to fuse them together.

4. A method of percussively welding contacts onto a plurality of wires on an electrical part which comprises the steps of simultaneously advancing a plurality of contact tapes, simultaneously shearing a contact from each of said tapes, feeding the contacts simultaneously to a plurality of welding heads, aligning the wires of said electrical part with said welding heads, electrically connecting each of said welding heads and the wires aligned therewith to sources of current for supplying welding current individually to each of said wires and the welding heads aligned therewith, and simultaneously propelling said heads toward said wires to thrust the contacts into engagement with said wires for effecting the welding of the contacts onto said wires.

5. An apparatus for welding contacts onto a plurality of wires of a switch part comprising a plurality of reciprocable welding heads having seats therein for supporting said contacts, a holder for supporting a switch part with the wires in the path of movement of said reciprocable welding head, means for simultaneously advancing a plurality of tapes, means for simultaneously severing a contact from each of said tapes, means for applying the contacts to the seats in said welding heads, means for electrically connecting each of said welding heads and the wire aligned therewith to a device for supplying welding currents to said contacts and said wires, and means for simultaneously actuating said welding heads to propel the contacts into engagement with the wires of said electrical switch part to effect the welding of the contacts to said wires.

6. An apparatus for welding contacts onto a plurality of wires of an electrical part comprising a plurality of reciprocable welding heads having recesses therein for supporting said contacts, a holder for supporting an electrical part with the wires in the path of movement of said reciprocable welding heads, means for electrically connecting the welding heads and the wires of said electrical part to sources of current for supplying welding currents to said contacts and said wires, means for intermittently advancing a plurality of tapes, means including a punch and die for severing contacts from said tapes, means for feeding the contacts into the recesses in said welding heads, and means for actuating said welding heads to thrust the contacts into engagement with the wires of said electrical part to effect the welding of the contacts to said wires.

7. An apparatus for welding contacts onto a plurality of wires of a switch part comprising a plurality of reciprocable welding heads having seats therein for supporting said contacts, a holder for supporting a switch part with the wires in the path of movement of said reciprocable welding head, means for positioning contacts in the seats of said welding heads, means for electrically connecting said welding heads and the wires of said electrical switch part to sources of electrical current for supplying welding currents individually to each of said wires and said contacts aligned therewith, and means for actuating said welding heads to thrust the contacts into engagement with the wires of said switch part to effect the welding of the contacts to said wires.

8. An apparatus for welding contacts onto a plurality of wires of a switch part comprising a holder for supporting said switch part in a predetermined position, a plurality of welding heads, each of said heads having a recess in the end thereof for supporting a contact therein, means for supporting and advancing a plurality of tapes of contact material, means for simultaneously severing a contact from each of said tapes, means for feeding the severed contacts into the recesses in said welding heads, means mounting said welding heads for reciprocation in alignment with the wires of a switch part supported in said holder for guiding the contacts into engagement with said wires, spring means stressing said welding heads for movement toward said wires, cam means for moving said heads from said wires and for simultaneously releasing said heads at predetermined intervals to permit the spring means to actuate said heads toward the wires, and means for electrically connecting each of the wires of said switch part and the welding head aligned therewith to a source of welding current.

9. An apparatus for welding contacts onto a plurality of wires of a switch part comprising a holder for supporting said switch part in a predetermined position, a plurality of welding heads, each of said heads having a recess for supporting a contact therein, means for inserting contacts into the recesses in said welding heads, means mounting said welding heads for reciprocation in alignment with the wires of a switch part supported in said holder for guiding the contacts into engagement with said wires, spring means stressing said welding heads individually for movement toward said wires, cam means for moving said heads from said wires and for releasing said heads at predetermined intervals to permit said spring means to actuate said heads toward the wires, and means for individually electrically connecting each of the wires of said switch part and the welding heads aligned therewith to individual sources of current to effect the welding of the contacts onto the wires in response to the engagement of said contacts with said wires.

10. An apparatus for welding contacts onto a plurality of wires of a switch part comprising a holder for supporting said switch part in a predetermined position, a plurality of welding heads, each having a seat at one end thereof for supporting a contact therein, means mounting said welding heads for reciprocation in alignment with the wires of a switch part supported in said holder for guiding the contacts into engagement with said wires, spring means stressing said welding heads for movement in one direction toward said wires, cam means for moving said heads in the opposite direction and for releasing said heads at a predetermined time to permit said spring means to actuate said heads in said one direction, means for electrically connecting the wires of said switch part and said welding heads to sources of current, a punch and die, means for guiding a plurality of tapes of contact material into said die and into the path of movement of said punch, means for actuating said punch to sever contacts from said tapes and carry them to a predetermined position, a carrier having a plurality of recesses for supporting the contacts in a predetermined spaced relation to each other corresponding to the spacing of the wires in said electrical switch part, means for transferring the contacts from said punch in said predetermined position to said carrier, and means for moving said carrier in timed relation to the actuation of said welding heads to position the carrier and the contacts therein in the path of movement of said welding heads, said cam means being operable to effect the movement of said heads toward said carrier and into engagement with the contacts thereon to effect the transfer of the contacts from said carrier to said welding heads.

11. An apparatus for welding contacts onto a plurality of wires of a switch part comprising a holder for supporting said switch part in a predetermined position, a plurality of welding heads, each having a recess for supporting a contact therein, means mounting said welding heads for reciprocation in alignment with the wires of a switch part supported in said holder for guiding the contacts in the heads into engagement with said wires, a punch and die, means for guiding a plurality of tapes into said die and into the path of movement of said punch, said punch having a plurality of recesses along the forward edge thereof for receiving said tapes and supporting contacts severed therefrom, means for actuating said punch to sever a contact from each of said tapes and carry said contacts to an unloading position, means for intermittently advancing said tapes in timed relation to the actuation of said punch, a carrier having a plurality of recesses for supporting the contacts in a predetermined spaced relation to each other corresponding to the spacing of the wires in said switch part, means for transferring the contacts from said punch and said unloading position to said carrier, means for reciprocating said carrier to and from a first position for receiving said contacts and a second position with the contacts therein aligned with and in the path of said welding heads, means for actuating said welding heads to advance them into engagement with the contacts in said carrier at said second position to effect the transfer of the contacts from said carrier to said heads and to propel said heads toward said holder to thrust the contacts against the wires on the switch part therein, and means for electrically connecting each of the wires of said switch part and the welding head aligned therewith individually to sources of welding current to effect the welding of the contacts to said wires.

12. An apparatus for welding contacts onto a plurality of wires of a switch part comprising a holder for supporting said switch part in a predetermined position, a plurality of welding heads, each of said heads having a recess for supporting a contact therein, means mounting said welding heads for reciprocation in alignment with the wires of a switch part supported in said holder for guiding the contacts in said heads into engagement with said wires, spring means stressing said welding heads for movement in one direction toward said holder, cam means engageable with said welding heads operable for moving said heads in the opposite direction and for releasing said heads at predetermined intervals to permit said spring means to actuate said heads in said one direction, means for electrically connecting each of the wires of said switch part and the welding head aligned therewith individually to a source of welding current, a punch and die, means for guiding a plurality of tapes into said die and into the path of movement of said punch, said punch having a plurality of recesses along the forward edge thereof forming cutting edges for severing contacts from said tapes and supporting the severed contacts, means for actuating said punch to sever the contacts and carry them to an unloading position, a carrier having a plurality of recesses disposed in a predetermined spaced relation to each other corresponding to the spacing of the wires in said electrical switch part for receiving the contacts therein, means for moving said carrier to and from a first position for receiving said contacts and a second position with the contacts therein in the path of movement of said welding heads, said cam means causing the movement of said heads into engagement with said carrier at said second position to effect the transfer of the contacts from said carrier to said welding heads, a plurality of L-shaped guideways for said contacts having horizontally disposed portions aligned with the recesses in said punch at said unloading position and vertically disposed portions aligned with the recesses in said carrier at said first position, pusher means in said horizontally disposed portions of said guideways for removing the contacts from said punch and advancing them to said vertical portions of said guideways, and pusher means in said vertically disposed portions of said guideways for pushing the contacts into the recesses in said carrier.

13. In an apparatus for percussively welding a contact onto an article, a holder for supporting said article in a predetermined position, a reciprocable flat electrode having a notch in the end thereof for receiving a contact, said notch having a surface disposed transversely to the reciprocable movement of said electrode for pressing a contact against the article, said electrode having a longitudinal slot extending from said notch to form a pair of spring arms for yieldably retaining said contact against said surface, means for electrically connecting the electrode and the article in the holder to a device for supplying welding current thereto, and means for actuating said electrode and contact toward and from said holder to move the contact into engagement with said article to percussively weld the contact to the article.

14. In an apparatus for percussively welding a contact onto an article, a holder for supporting an article in a predetermined position, an electrode mounted for movement toward and from said holder and having a recess for receiving a contact, said recess having a first surface disposed transversely of the direction of movement of said electrode for pressing the contact against the article in response to movement of the electrode toward the holder and having a pair of spaced surfaces extending laterally from said first surface for engaging and holding a contact in engagement with said first surface and permitting free movement of the contact from the electrode after the contact has been welded to said article, means for feeding a tape of contact material, means for shearing said tape along two lines to form a contact, means for feeding the contact into the recess in said electrode, means for electrically connecting the electrode and the article in the holder to a device for supplying welding current thereto, and means for actuating said electrode toward and from said holder to move the contact into impact engagement with the article to percussively weld the contact to the article.

15. In an apparatus for percussively welding a contact to an article, a holder for supporting the article in a predetermined position, an electrode having a notch in one end thereof for receiving a contact and having a longitudinal slot extending from said notch to form a pair of spring arms for yieldably retaining said contact in said notch, a feeding member for supporting a contact in alignment with the notch in said electrode, means for effecting relative movement between the feeding member and the electrode to cause the transfer of the contact into the notch of the electrode, means for electrically connecting the electrode and the article in the holder to a device for supplying welding current thereto, and means for actuating said electrode toward and from said holder to effect the movement of the contact into engagement with the article with an impact to cause the percussive welding of the contact to the article.

16. In an apparatus for percussively welding a contact to an article, a holder for supporting the article in a predetermined position, a flat electrode having a notch in the end thereof for receiving a contact and having a longitudinal slot extending from the notch to form a pair of spring arms for yieldably retaining a contact in the notch, means for electrically connecting the electrode and the article in the holder to a device for supplying welding current thereto, a feeding member for supporting a contact, means for moving the feeding member to and from an operative position for supporting a contact in the path of travel of said electrode, cam means operable in timed relation to said last-named means for moving said electrode toward said feeding member into engagement with a contact therein to effect a transfer of the contact from said member to the recess of said electrode and for moving said electrode from said feeding member, said cam means also serving to move said electrode from said holder and to release said electrode at a predetermined position, and resilient means for moving said electrode toward said holder to effect the movement of the contact into engagement with said article with an impact to cause the percussive welding of the contact onto the article.

17. In an apparatus for forming contacts from a tape of contact material, a punch, a die having a first aperture for receiving said punch and having a second aperture conforming substantially to the cross section of said tape and disposed transversely of said first aperture for receiving and supporting a tape for longitudinal movement therein transversely of the punch and in the path of movement thereof, means for reciprocating said punch to shear the tape along two spaced portions to form a contact and to advance said contact to a predetermined position, means on said punch for holding the contact for movement with the punch to said predetermined position, and means for removing the contact from the holding means at said predetermined position.

18. In an apparatus for forming contacts from a tape of contact material, a flat punch having a notch at one end thereof for receiving the tape therein and forming a first pair of spaced cutting edges, a die having a first aperture for receiving said punch and having a second aperture conforming substantially to the cross section of said tape and disposed transversely of said first aperture for supporting a tape for longitudinal movement transversely of the punch and in the path of movement of the notch therein and forming a second pair of cutting edges cooperable with the first pair of cutting edges on said punch to shear the tape along two spaced portions to form a contact, and means for actuating said punch to shear the tape and advance the contact to a predetermined position, said notch in the punch serving to support said contact for movement with the punch to said predetermined position.

19. In an apparatus for percussively welding contacts onto articles, a holder for supporting an article in a predetermined position, an electrode mounted for movement toward and from said holder and having a recess for receiving a contact, said recess having a first surface disposed transversely of the direction of movement of said electrode for pressing the contact against the article in response to movement of the electrode toward the holder and having a pair of spaced surfaces extending laterally from said first surface for engaging and holding a contact in engagement with said first surface and permitting free movement of the contact from the electrode after the contact has been welded to said article, a punch having a pair of spaced cutting edges, a die having a first aperture for slidably receiving the punch and having a second aperture intersecting the first aperture for guiding the tape across the path of movement of the punch and forming a pair of cutting edges cooperable with the cutting edges on the punch for shearing the tape along two spaced portions to form a contact, means for actuating the punch to shear the tape and form a contact, means for transferring the contact to the recess in the electrode, means for impressing a welding voltage across the contact and the article, and means for moving the electrode toward the holder to bring the contact into percussive engagement with the article to draw an arc between them and fuse the contact to the article.

20. In an apparatus for forming contacts from a contact tape, a punch having a pair of spaced cutting edges, a die having a first aperture for slidably receiving said punch and having a second aperture intersecting the first aperture for guiding the tape across the first aperture and the path of movement of the punch and forming a pair of cutting edges cooperable with the cutting edges on the punch for shearing the tape along two spaced portions to form a contact, and means for actuating the punch to shear the tape to form the contact.

References Cited in the file of this patent

UNITED STATES PATENTS

| | | |
|---|---|---|
| 1,534,070 | MacFarland | Apr. 21, 1925 |
| 1,601,283 | Atkins | Sept. 28, 1926 |
| 1,715,099 | Robinson | May 28, 1929 |
| 1,994,701 | Hall | Mar. 19, 1935 |
| 2,078,694 | Smith | Apr. 27, 1937 |
| 2,129,845 | King et al. | Sept. 13, 1938 |
| 2,343,686 | Martindell | Mar. 7, 1944 |
| 2,419,749 | Weinhardt et al. | Apr. 29, 1947 |
| 2,428,540 | Babbitt et al. | Oct. 7, 1947 |
| 2,467,379 | Graham | Apr. 19, 1949 |